(12) United States Patent
Crane et al.

(10) Patent No.: US 10,156,148 B2
(45) Date of Patent: Dec. 18, 2018

(54) TRANSITION DUCT ASSEMBLY

(71) Applicant: SIEMENS AKTIENGESELLSCHAFT, München (DE)

(72) Inventors: John M. Crane, Oviedo, FL (US); Jens Kleinfeld, Mülheim an der Ruhr (DE); Kagan Özkan, Neuss (DE)

(73) Assignee: SIEMENS AKTIENGESELLSCHAFT (DE)

( * ) Notice: Subject to any disclaimer, the term of this patent is extended or adjusted under 35 U.S.C. 154(b) by 393 days.

(21) Appl. No.: 14/674,280

(22) Filed: Mar. 31, 2015

(65) Prior Publication Data
US 2016/0290165 A1    Oct. 6, 2016

(51) Int. Cl.
*F01D 9/02* (2006.01)
*F01D 25/24* (2006.01)
*F01D 25/30* (2006.01)
*F01D 25/12* (2006.01)
*F02C 6/08* (2006.01)
*F02C 7/12* (2006.01)

(52) U.S. Cl.
CPC .............. *F01D 9/023* (2013.01); *F01D 25/12* (2013.01); *F01D 25/243* (2013.01); *F01D 25/30* (2013.01); *F02C 6/08* (2013.01); *F02C 7/12* (2013.01)

(58) Field of Classification Search
CPC ........ F01D 9/023; F01D 11/005; F01D 25/12; F01D 25/30; F01D 25/243; F05D 2240/55; F16J 15/0887; F02C 7/28; F02C 6/08; F02C 7/12
See application file for complete search history.

(56) References Cited

U.S. PATENT DOCUMENTS

| 7,090,224 | B2 * | 8/2006 | Iguchi | F01D 11/005 277/603 |
| 7,097,423 | B2 * | 8/2006 | Burdgick | F01D 11/005 415/173.7 |
| 7,788,932 | B2 * | 9/2010 | Kunitake | F01D 9/023 60/797 |
| 8,118,549 | B2 * | 2/2012 | Schiavo | F01D 9/023 415/182.1 |
| 8,142,142 | B2 | 3/2012 | Zborovsky et al. | |
| 8,398,090 | B2 * | 3/2013 | McMahan | F01D 9/023 277/643 |
| 8,562,000 | B2 * | 10/2013 | Moehrle | F01D 9/023 277/644 |
| 9,182,039 | B2 | 11/2015 | Aschenbruck et al. | |

(Continued)

FOREIGN PATENT DOCUMENTS

DE    10 2007 062 681 A1    6/2009
WO    WO 2010/027384 A1    3/2010

*Primary Examiner* — David E Sosnowski
*Assistant Examiner* — Sang K Kim
(74) *Attorney, Agent, or Firm* — Ostrolenk Faber LLP

(57) ABSTRACT

A transition duct assembly has a plurality of transition ducts (2). Each transition duct has a tubular main body and has a flange portion provided at a downstream end of tubular main body (3). There is a gap between neighboring flanges. A plurality of seals seal the gaps between the flange portions (4) of neighboring transition ducts (2). Each seal (5) is received in two opposing receiving channels (7) formed in side edges (8) of neighboring flange portions (4). Each seal is a one-piece and bent elongate spring steel strip.

6 Claims, 3 Drawing Sheets

(56) References Cited

U.S. PATENT DOCUMENTS

| | | |
|---|---|---|
| 2008/0202124 A1 | 8/2008 | Sutcu et al. |
| 2010/0247005 A1* | 9/2010 | Aschenbruck .......... F01D 9/023 384/15 |
| 2012/0292862 A1* | 11/2012 | Moehrle ............... F01D 11/003 277/654 |
| 2014/0023489 A1* | 1/2014 | Fujimoto ............. F16J 15/0887 415/170.1 |
| 2016/0215644 A1* | 7/2016 | Snyder ................. F01D 11/005 |

* cited by examiner

PRIOR ART

TRANSITION DUCT ASSEMBLY

BACKGROUND OF THE INVENTION

The present invention relates to a transition duct assembly comprising a plurality of transition ducts. Each transition duct has a tubular main body, a flange portion provided at a downstream end of the tubular main body, and a plurality of seals for sealing gaps present between flange portions of neighboring transition ducts. Each seal is received in two opposing receiving channels formed in side edges of the flange portions.

Transition duct assemblies are known in the field of gas turbine engines. A conventional gas turbine engine comprises a compressor, a combustor having several combustor units, a turbine and a transition duct assembly, wherein the transition ducts fluidically connect the single combustor units with the turbine. During the operation of a gas turbine engine, the compressor feeds compressed ambient air to the combustor units. In the combustor units the compressed air is combined with a fuel, whereupon the created mixture is ignited. The combustion products form a working gas, which is routed from the combustor units towards the turbine via the transition ducts. In the turbine the working gas drives rotating blades coupled to a shaft in order to transform the inner energy of the working gas into mechanical energy.

In order to achieve a high degree of efficiency, it is important to avoid or minimize the leakage of compressed air within the gas turbine engine, because such leakages can negatively affect the combustion as well as the required cooling of the gas turbine engine. In particular, it should be prevented that compressed air, which is present in the space surrounding the combustor units, leaks towards the turbine. Due to the high temperature difference present between these engine parts, such a leakage leads to stimulation of undesired oscillations, which may significantly reduce the lifetime of gas turbine engine components, in particular the lifetime of the rotating blades of the turbine.

In order to prevent such a leakage of compressed air towards the turbine, it is already known to provide seals sealing the gaps present between flange portions of neighboring transition ducts. Such seals are normally received in two opposing receiving channels formed in side edges of said flange portions. For example FIGS. 4 and 5 show a known seal 100, which is made of a elongate straight steel strip having a square cross section and a thickness of about 3 mm, wherein the steel strip comprises a riffled surface 101 on one side. The seal 100 seals a gap 102 present between two flange portions 103, each seal being arranged at a downstream end of a tubular main body 104 of a corresponding transition duct 105, which is not shown in further detail. More precisely, the seal 100 is received in two opposing receiving channels 106 formed in side edges 107 of the flange portions 103. The width of the receiving channels 106 is chosen much wider than the thickness of the seal 100, such that the seal 100 is received with large clearance. Accordingly, the seal 100 can freely move within the receiving channels 106 in order to prevent jamming during the operation of the gas turbine engine. However, the wear of the known seal 100 is very high. Accordingly a frequent replacement of such seals 100 is necessary.

SUMMARY OF THE INVENTION

Starting from this prior art it is an object of the present invention to provide an optimized transition duct assembly of the above-mentioned kind.

In order to solve this object, the present invention provides a transition duct assembly of the above-mentioned kind, wherein each seal of the plurality of seals consists of a one-piece and bent elongate spring steel strip. Because the seals according to the present invention are made of a bent spring steel strip, the seals are able to easily follow movements of the transition ducts during the operation of a gas turbine engine with little liability to wear, because the seals are always held in close contact with the receiving channels without pounding against channel walls. Thanks to the one-piece-construction of each seal, the number of components is low at the same time.

According to one aspect of the present invention each seal of the plurality of seals is received within the receiving channels essentially free of clearance as a further measure against pounding.

Preferably, the free ends of lateral edge portions of each seal of the plurality of seals are bent over, in particular by about 180°. Thus, the lateral edge portions of the seal, which are received in the opposing receiving channels of the flange portions, are formed with a U-shape, whereby movements of the lateral edge portions within the receiving channels can be resiliently compensated.

The free ends of the lateral edge portions may face each other. Accordingly, a symmetrical formation of the lateral edge portions is achieved, which is positive with respect to the achievement of a consistent load of the seal during the operation of the gas turbine engine.

Preferably, each seal of the plurality of seals is formed with at least one outwardly projecting bulge.

According to one aspect of the invention the lateral edge portions of each seal of the plurality of seals are provided with a plurality of openings. Through such openings cooling air can be routed during the operation of the gas turbine engine.

Preferably, the openings are arranged at uniform intervals. Thus, a uniform cooling can be achieved.

The openings may have the shape of slots. Such slots are easy to manufacture.

According to one aspect of the present invention each seal of the plurality of seals is received at its outer radial end portion in a retention tap. Such a retention tap simplifies the assembly and disassembly of the seal.

Preferably, the outer radial end portions of the seals and the retention taps are welded together to ensure a strong connection between these components.

Preferably, each seal of the plurality of seals has a constant thickness between 1.0 and 1.5 mm to enhance the flexibility of the seal.

Moreover, the present invention proposes the use of a one-piece and bent elongate spring steel strip as a one-piece seal for sealing a gap present between flange portions of neighboring transition ducts of a gas turbine engine.

Further features and advantages will become apparent by means of the following description of a transition duct assembly according to an embodiment of the present invention with respect to the drawing. In this drawing

DESCRIPTION OF AN EMBODIMENT

Figure 1:
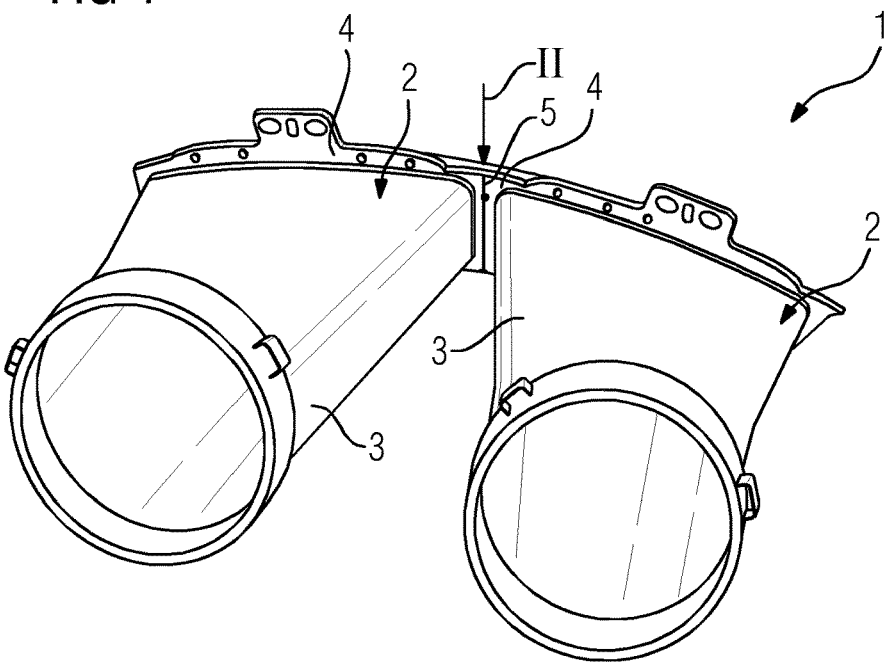
FIG. 1 is a perspective view of two neighboring transition ducts of a transition duct assembly according to an embodiment of the present invention.

FIG. 1 shows a part of a transition duct assembly 1 according to an embodiment of the present invention, which is installed in a gas turbine engine between a combustor and a turbine. The transition duct assembly 1 comprises a plurality of transition ducts 2 fluidly connecting single combustor units of the combustor with the turbine. The transition ducts 2 are positioned in a ring-shaped arrangement, wherein only two of these transition ducts 2 are depicted in FIG. 1. Each transition duct 2 has tubular main body 3 and a flange portion 4, which is formed at a downstream end of the tubular main body 3 and fixed to the turbine of the gas turbine engine.

Figure 2:
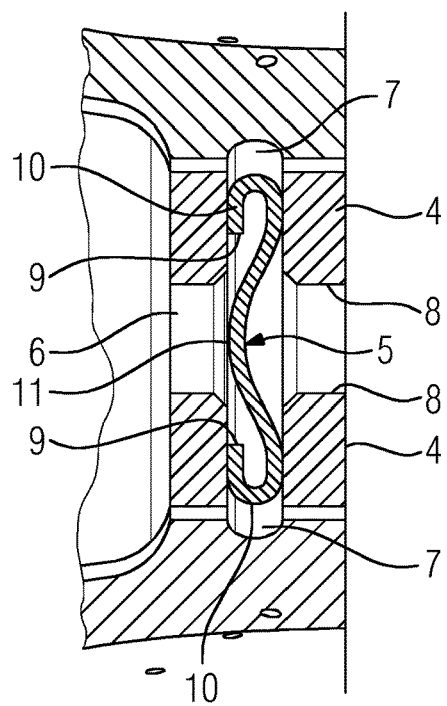
FIG. 2 is a cross sectional top view of a seal provided in a gap present between flange portions of the neighboring transition ducts shown in FIG. 1 when viewed in the direction of arrow II in FIG. 1.
Figure 3:
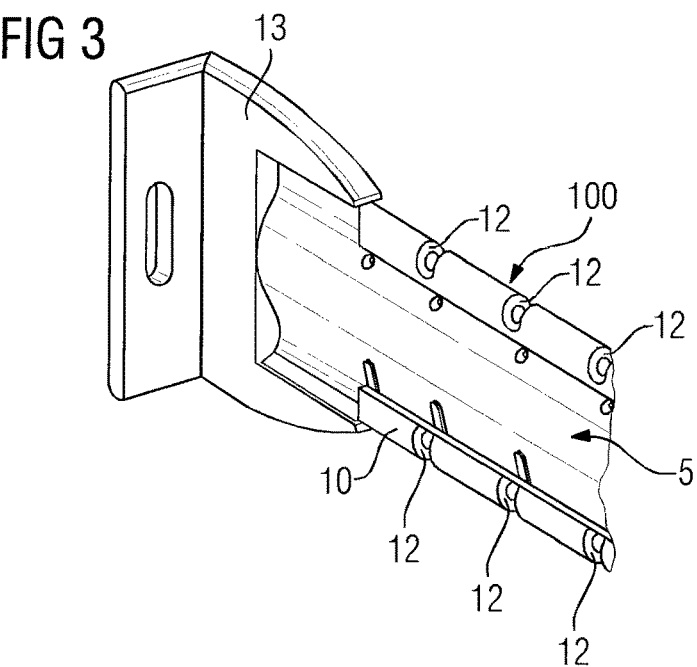
FIG. 3 is a perspective view of an upper part of the seal shown in FIG. 2.
Figure 4:
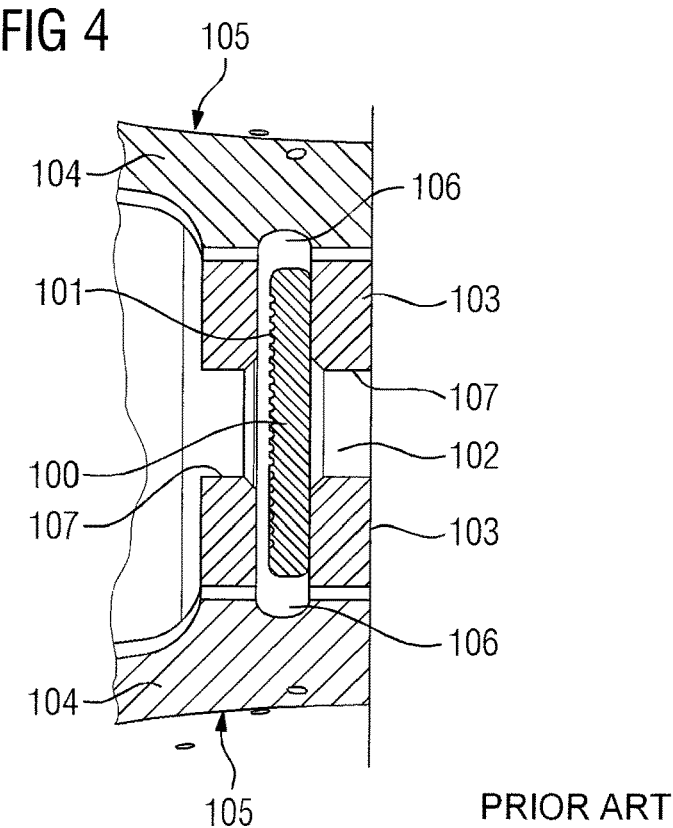
FIG. 4 is a cross sectional top view similar to FIG. 2 showing a prior art seal provided in a gap present between flange portions of neighboring transition ducts.
Figure 5:
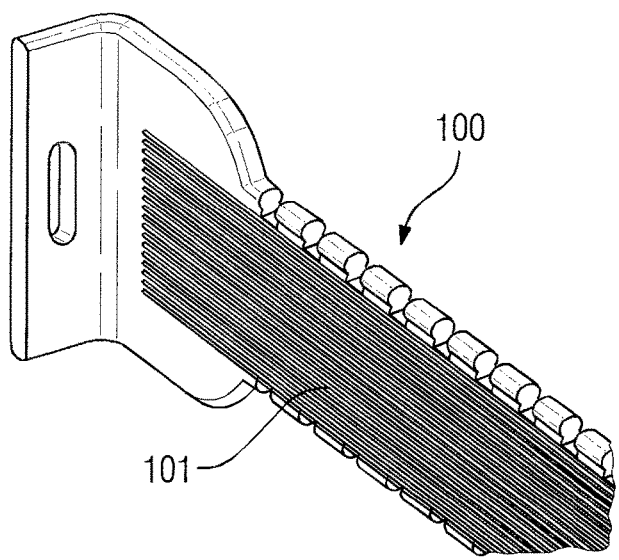
FIG. 5 is a perspective view of an upper part of the seal shown in FIG. 4.

Moreover, the transition duct assembly 1 comprises a plurality of seals 5 for sealing gaps 6 present between flange portions 4 of neighboring transition ducts 2. As shown in FIG. 2, each seal 5 is received in two opposing receiving channels 7 formed in side edges 8 of the flange portions 4. The seals 5 are identically designed and consist of a one-piece and bent elongate spring steel strip having a constant thickness of 1 mm. The free ends 9 of lateral edge portions 10 of the seals 5 are bent over by 180° to shape a U-form, whereby the free ends 9 of the lateral edge portions 10 are facing to each other and have outer surfaces which contact the flange portions 4. Each seal 5 is formed in its radial center with a bulge 11 projecting in an axial and extending in a tangential direction, the bulge 11 being disposed substantially coplanar with the outer surfaces of the free ends 9, as shown in FIG. 2. The lateral edge portions 10 of the seals 5 are provided with a plurality of slot-like openings 12 arranged at uniform intervals as shown in FIG. 3. Each seal 5 is received at its outer radial end portion in a retention tap 13 and is fixed by means of welding. The width of the receiving channels 7 of the flange portions 4 and the height of the lateral edge portions 10 of the seals 5 are chosen in such a manner, that seals 5 are received within the corresponding receiving channels 7 essentially free of clearance.

During operation of the gas turbine engine, the seals 5 prevent that compressed air can leak through the gaps 6 towards the turbine. Thanks to the fact, that the seals 5 according to the present invention are made of a bent spring steel strip and that the seals 5 are held within the receiving channels 7 essentially without clearance, the seals 5 are able to easily follow movements of the transition ducts 2 with little liability to wear, because the seals 5 are always held in close contact with the receiving channels without pounding against channel walls. Thanks to the one-piece-construction of each seal 5 the number of components is low at the same time.

While a particular embodiment of the present invention has been illustrated and described, it would be obvious to those skilled in the art that various other changes and modifications can be made without departing from the scope of the invention. It is therefore intended to cover in the appended claims all such changes and modifications that are within the scope of this invention.

The invention claimed is:

1. A transition duct assembly comprising:
    a plurality of transition ducts, each transition duct having a tubular main body and a flange portion, the flange portions each extending between a downstream end of its respective main body and the neighboring tubular main body;
    each flange portion including a side edge thereof opposing a side edge of the neighboring flange portion; the opposing side edges of neighboring flange portions being spaced apart to define a gap;
    each side edge has a seal receiving channel therein;
    a plurality of seals each for sealing the gap present between the flange portions neighboring ones of the transition ducts;
    each seal has opposite lateral edge portions which are received in the two respective opposing seal receiving channels formed in the opposing side edges of two opposing flange portions of neighboring ducts; and
    each seal of the plurality of seals comprises a one-piece and bent elongate spring steel strip;
    wherein opposite lateral edge portions of each seal are bent by 180° so as to have respective free ends facing each other, said free ends have outer surfaces which contact the flange portion, and each seal includes an outwardly projecting bulge between the lateral ends thereof, the bulge being disposed substantially coplanar with said outer surfaces of the free ends of the seal;
    further comprising a retention tap positioned and configured so that each seal of the plurality of seals has an outer radial end portion extending between its lateral edge portions which is received in the retention tap,
    wherein the outer radial end portions of the seals and the respective retention taps are welded together.

2. A transition duct assembly according to claim 1, wherein each seal of the plurality of seals and the respective receiving channels for the seal are sized and shaped so that each of the lateral edge portions of each seal is received within the respective receiving channel therefor, essentially free of clearance between the lateral edge portion in the channel and side walls of the channel receiving the lateral edge portion of the seal.

3. A transition duct assembly according to claim 1, wherein the lateral edge portions of each seal of the plurality of seals are provided with a plurality of openings.

4. A transition duct assembly according to claim 3, wherein the lateral edge portions have openings arranged at uniform intervals along the lateral edge portions.

5. A transition duct assembly according to claim 4, wherein the openings have the shape of slots.

6. A transition duct assembly according to claim 1, wherein each seal of the plurality of seals comprises the steel strip having a constant thickness between 1.0 and 1.5 mm.

* * * * *